United States Patent Office 3,303,190
Patented Feb. 7, 1967

3,303,190
NOVEL DIHYDRO-2,1-BENZOTHIAZINE-2,2-
DIOXIDE COMPOUNDS
Bernard Loev, Broomall, Pa., assignor to Smith Kline &
French Laboratories, Philadelphia, Pa., a corporation of
Pennsylvania
No Drawing. Filed Mar. 11, 1965, Ser. No. 439,099
9 Claims. (Cl. 260—243)

This invention relates to a series of new heterocyclic compounds and processes for preparing them. More specifically the compounds of this invention are characterized by possessing as the basic ring structure a dihydrosulfostyril nucleus. The compounds of this invention are useful as having pharacodynamic activity for example hypotensive, sedative or antidiabetic activity or as intermediates for preparing other sulfostyril compounds having similar activities.

The compounds of this invention are illustrated by the following structural formula:

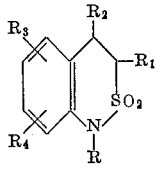

Formula I in which:
R is hydrogen, lower alkanoyl such as acetyl, lower alkyl of 1–8 carbons such as methyl or ethyl, phenyl or preferably dialkylaminoalkyl;
$R_1$ and $R_2$ are hydrogen, lower alkyl or phenyl; and
$R_3$ and $R_4$ are hydrogen, halogen such as chloro, bromo or fluoro, nitro, amino, sulfonamido, lower alkyl such as methyl or ethyl, lower alkoxy such as methoxy and ethoxy, trifluoromethyl, lower alkyl thio such as methylthio or ethylthio or when taken together methylenedioxy.

The compounds of Formula I in which R is hydrogen are particularly useful for preparing the N-substituted compounds which have particularly useful biological, especially hypotensive, activity.

The compounds thusly preferred are those represented by the structural formula:

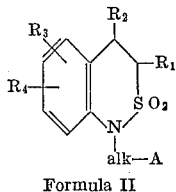

Formula II in which:
$R_1$ to $R_4$ are as defined above;
alk is a straight or branched alkylene chain of from 2–6 carbon atoms separating N and A by at least 2 carbon atoms; and
A is diloweralkylamino, loweralkylamino, amino, or a basic saturated heterocyclic N-containing end group having from 4–10 carbon atoms such as N-pyrrolidinyl, N-N'-loweralkylpiperazinyl, N-N'-hydrogen piperazinyl, N-piperinyl, C-N-methylpiperidinyl, C-N-methylpyrrolidinyl, N-morpholinyl, or N-thiomorpholinyl (said A groups are referred to herin as "dialkylamino").

Also included in this invention are nontoxic salts of the basic compounds of Formulas I and II with pharmaceutically acceptable acids such as hydrochloric, sulfuric, phosphoric, sulfamic, maleic, methane disulfonic, or pamoic acids or with standard quaternizing compounds known to the art such as a lower alkyl iodide, bromide or chloride, a lower alkyl sulfate, or a lower alkyl toluene sulfonate. Such salt derivatives are prepared by methods well known to the art such as reaction of an excess of the acid or quaternizing agent with the base in an organic solvent such as ether, ethyl acetate, benzene or toluene.

The parent dihydrosulfostyrils (in which R is hydrogen) also form alkali metal salts such as by reaction with an alkali metal lower alkoxide in benzene or dimethylsulfoxide or with an alkali hydroxide in water. Such nontoxic salts especially sodium and potassium salts are part of this invention.

The compounds of this invention are most conveniently prepared by the following novel process starting from known starting materials:

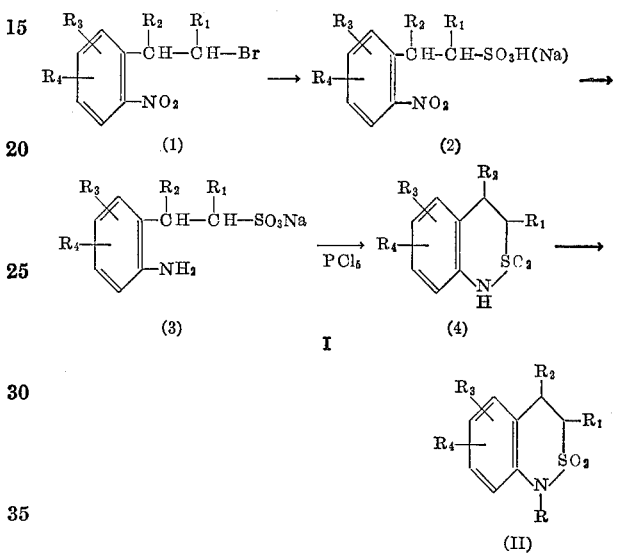

In this reaction sequence $R_1$–$R_4$ are as defined above and R is lower alkyl, phenyl or dialkylaminoalkyl as defined.

The optionally substituted o-nitrophenethyl halide (1) prepared by methods known to the art [Foreman, E. L. et al. J. Am. Chem. Soc. 62:1435 (1940); Akaboshi, S. et al., C. A. 60:10647; Lesiak, T., Roczniki Chem., 37:499 (1936); Akaboshi, S. et al., Chem. Pharm. Bull. (Tokyo), 11:1446 (1936)], is treated with thiourea to form the thiouronium bromide which is then converted to the sulfonyl chloride with chlorine gas. The sulfonyl chloride is hydrolyzed to give the o-nitrophenethylsulfonic acid (2) which is reduced by standard methods for reducing a nitro group such as using a chemical reducing agent for example ferrous hydroxide or catalytic hydrogenation conditions for example with palladium-on-charcoal catalyst thereby yielding an o-aminophenethylsulfonic acid (3). The alkali metal salt of the acid (3) is reacted with an excess of acetyl chloride to give the desired 3,4-dihydrosulfostyril (I). Other acid halides such as benzoyl bromide, phosphorus oxychloride, thionyl bromide, phosphorus pentachloride can be used alternatively to cause cyclization.

The dihydrosulfostyril (I) is N-alkylated in good yield using a dialkyl sulfate and base or N-arylated using either a specific alkylating agent such as diphenyliodonium iodide, or an arylhalide with cuprous chloride catalyst. The dialkylaminoalkyl substituted compounds of Formula II are prepared by reaction of the chosen dialkylaminoalkyl reactive ester such as the chloride, bromide, iodide or tosylate with the dihydrosulfostyril in the presence of a strong acid binding agent such as an alkali metal hydride such as sodium or potassium hydride or alkali metal alcoholate, such as sodium methoxide in an inert solvent such as dimethylsulfoxide or benzene or mixtures of such solvents. The reaction is usually carried out with heating such as at reflux for long periods of time, i.e., 12–36 hours. Alternatively the alkali metal salt may be reacted with the ester in aqueous solution, although this usually gives poorer results.

The dihydrosulfostryril (I) is acylated by refluxing with an acid anhydride, such as acetic anhydride or by reaction of the alkali metal salt with an acid halide such as benzoyl chloride.

The compounds of Formula II in which A is amino, monoalkylamino, piperazinyl, etc. are prepared by either reacting the parent dihydrosulfostryril with acrylonitrile then reducing to the primary amine; N-alkylating with a haloalkanol, reaction with tosyl chloride to form the tosyloxy compound or a halogenating agent such as phosphorus pentachloride then with the desired amine or by N-alkylating with an N-haloalkylamide, followed by hydrolysis of the amide. These intermediate compounds are an important part of this invention as follows:

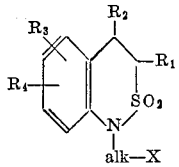

Formula III in which $R_1$–$R_4$ and alk are as described and X is cyano, hydroxyl, chloro, tosyloxy or loweracylamino.

Unexpectedly the dihydrosulfostryils of this invention have been found to be extremely stable to heat therefore attempts to form sulfostryils by dehydrogenation with various catalysts failed.

On the other hand many of the dihydrosulfostryril compounds of Formula I are most readily available by hydrogenation of the corresponding sulfostryril congener prepared according to copending Serial No. 439,098 filed March 11, 1965. This hydrogenation is carried out using standard catalytic hydrogenation procedures such as palladium-on-charcoal catalyst, or chemical reducing procedures, such as sodium and alcohol.

It has also been unexpectedly found that certain nuclear substituted dihydrosulfostryils of Formula I can be prepared by direct reaction of nucleophilic reagents with the parent dihydrosulfostryril. For example, dihydrosulfostyril can be nuclear brominated using N-bromosuccinimide in dimethylformamide to give both 6-bromo-3,4-dihydrosulfostryril and 6,8-dibromo-3,4-dihydrosulfostryril. With N-substituted dihydrosulfostryils such as N-methyl-3,4-dihydrosulfostryril this reaction gives predominently the 6-bromo derivative. Dihydrosulfostryils therefore do not react at the 3,4-position readily as noted above in attempts to dehydrogenate. Dihydrosulfostryril can also be nitrated in the 6 or 6,8-positions. These can be converted via reduction to the amines and via diazotisation of these to the hydroxy, methoxy, halo and other derivatives. Dihydrosulfostryril can be chlorosulfonated to give, after treatment with ammonia, the 6-sulfonamido derivative.

Certain substituted dihydrosulfostryril derivatives are prepared by reacting activated ethylene sulfonanilides such as:

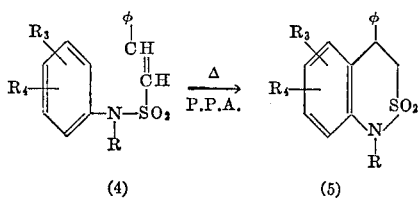

In this reaction a styrenesulfonanilide is reacted with aluminum chloride or in a large excess of polyphosphoric acid with heating at from about 75° C. up to 150° C. to give the desired dihydrosulfostryril. Ring formation does not occur when an ethylene sulfonanilide, that is, an unactivated ethylene containing compound, is used under similar conditions.

The compounds of Formulas I, II and III which are the object of this invention form a new series of sultams which may be named as 2,1-benzothiazine-2,2-dioxide or o-aminostyrene-β-sulfonic acid sultam. The coined name "sulfostryril" is most conveniently used herein.

The term "lower" where used herein together with a hydrocarbon term such as alkyl, alkoxy, acyl, etc. denotes straight and branched alkyl groups known and commonly used in the art. Such groups commonly contain from 1–8 carbon atoms preferably 1–2 carbon atoms in said alkylene or hydrocarbon term. Alternative substituents, reactants or reaction conditions will be apparent to those skilled in the art but such are considered within the ambit of this invention. The following examples will illustrate the invention described herebefore but are not designed to limit this invention.

*Example 1*

A mixture of 0.1 mole of 2-(o-nitrophenyl)-ethyl bromide, 0.11 mole of thiourea and 100 ml. of ethanol is heated at reflux for one hour. The solution is then concentrated, cooled and filtered to give the thiouronium bromide, M.P. 147–149° C. The salt (0.1 mole) dissolved in 250 ml. of 50% aqueous acetic acid is maintained at 15° C. while chlorine gas is passed through the solution for 1.5 hours. The separated sulfonyl chloride is purified by washing with cold water and recrystallization from isopropyl ether, M.P. 70–71° C.

(a) The sulfonyl chloride (12.5 g.) is suspended in ethanol. The mixture is heated at reflux for several hours. After concentration in vacuo the residual oil is dissolved in water and hydrogenated using 10% palladium-on-carbon catalyst at 50 p.s.i. for one hour. After filtration and concentration, 2-(o-aminophenyl)-ethane sulfonic acid, M.P. 285° C., is recovered.

(b) Another portion of the sulfonyl chloride (25 g.) is stirred with 100 ml. of 10% sodium hydroxide solution than reduced as described to give the sodium salt of 2-(o-aminophenyl)-ethane sulfonic acid. A small sample of the salt is dissolved in water and acidfied to recover the zwitterion, M.P. 284–286° C.

The dried sodium salt (33.4 g.) is powdered and stirred with 80 ml. of acetyl chloride. Phosphorus pentachloride (41.6 g.) is added followed by heating on the steam bath for 15 minutes. The volatiles are removed in vacuo. The residue is stirred with cold water then heated, with stirring on the steam bath for one hour. The suspension is cooled and filtered to give 3,4-dihydrosulfostryril, M.P. 151–153° C. From the filtrate, can be isolated and recycled some unreacted sulfonic acid.

The zwitterion cannot be cyclized to the dihydrosulfostyril under such conditions.

A solution of 3,4-dihydrosulfostryril in dimethyl formamide is reacted with an equimolar amount of sodium methoxide. On addition of ether, the sodium salt separates from the reaction mixture.

*Example 2*

A solution of dimethylaminomethyl chloride in benzene is prepared by dissolving the hydrochloride (8.21 g., 0.057 mole) in 10 ml. of water, cooling and adding 50 ml. of benzene then slowly 6 ml. of 40% sodium hydroxide solution. The dried organic layer is added with stirring to a solution prepared by adding 1.1 g. of 55% sodium hydride in mineral oil to 4.3 g. (0.0235 mole) of dihydrosulfostryril in 50 ml. of dry dimethylsulfoxide. A reflux period of 21 hours is followed by removing the benzene and adding 150 ml. of water. The mixture is extracted with ether to give the oily base. The base dissolved in ether and reacted with ethereal hydrogen chloride gives the hydrochloride salt of N-(2-dimethylaminoethyl)-3,4-dihydrosulfostryril, M.P. 152–154° C. from ethanol.

Example 3

Reacting 4.0 g. (0.022 mole) of dihydrosulfostyril with 1.1 g. of 55% sodium hydride in oil then with 6.56 g. (0.0543 mole) of dimethylaminopropyl chloride as described in Example 2 in detail gives the oily base and the hydrochloride salt of N-(3-dimethylaminopropyl)-3,4-dihydrosulfostyril, M.P. 157–158° C. A small portion of the oily base (500 mg.) is reacted with an excess of ethyl iodide in dimethylsulfoxide at reflux. Evaporation of the solvent and trituration with ether gives the ethiodide quaternary salt.

Example 4

A mixture of 4.9 g. (0.027 mole) of dihydrosulfostyril, 16 g. (0.04 mole) of diphenyl iodonium iodide, 1.44 g. (0.027 mole) of sodium methoxide and 100 ml. of methanol with 0.2 g. of cuprous chloride is heated at reflux for 2½ days. The cooled mother filtrate is concentrated in vacuo. The residue is dissolved in methylene chloride then extracted with dilute sodium hydroxide solution. The organic layer is dried and concentrated to give N-phenyl-3,4-dihydrosulfostyril, M.P. 121–123° C. from isopropanol.

Example 5

A mixture of sodium methoxide (0.022 mole), 4 g. (0.022 mole) of dihydrosulfostyril and dimethyl formamide is heated on the steam bath for 15 minutes then 6 ml. of dimethylsulfate is added. After heating at reflux for two hours and concentrating in vacuo, N-methyl-3,4-dihydrosulfostyril, M.P. 80–82° C., is obtained.

Example 6

A suspension of 5 g. (0.019 mole) of styrenesulfonanilide [Bordwell et al., J. Am. Chem. Soc., 68, 139 (1946)] in 100 g. of polyphosphoric acid is heated with stirring at 130° C. for 10 minutes, cooled and poured into water. The resulting solid is extracted with hot cyclohexane. The insoluble material is recrystallized from aqueous ethanol then sublimed to give 4-phenyl-3,4-dihydrosulfostyril, M.P. 161–162° C.

This material (2 g.) is reacted with potassium hydride then 3-N-methylpiperazinylpropyl bromide to give N-(N'-methylpiperazinylpropyl) - 4 - phenyl-3,4-dihydrosulfostyril and its dihydrochloride salt.

Example 7

A solution of 0.27 g. (0.0015 mole) of N-bromo-succinimide in dimethylformamide is added to a suspension of dihydrosulfostyril in dimethylformamide. After five minutes, the solution is diluted with water to give 6-bromo-3,4-dihydrosulfostyril, M.P. 183–186° C. from ethylacetatepentane.

This compound (0.5 g.) is reacted with an equimolar amount of sodium hydride and N-pyrrolidinyl isopropyl chloride as described to give N-(N-pyrrolidinylisopropyl)-6-bromo-3,4-dihydrosulfostyril and its maleate salt.

Example 8

A solution of 3.56 g. (0.02 mole) of N-bromo-succinimide in dimethylformamide is reacted with 1.85 g. (0.01 mole) of dihydrosulfostyril as described in Example 7. Dilution with water gives 6,8-dibromo-3,4-dihydrosulfostyril, M.P. 191–193° C. from ethyl acetatepentane.

This compound (5 g.) is alkylated with equimolar amounts of sodium hydride and 2-(N-methylpiperidinyl-2'-)ethyl bromide as described to give 6,8-dibromo-N-(N-methylpiperidinyl-2'-ethyl)-3,4-dihydrosulfostyril.

Example 9

A mixture of 3.9 g. (0.02 mole) of N-methyldihydrosulfostyril and 3.6 g. (0.02 mole) of N-bromo-succinimide in 15 ml. of dimethylformamide is stirred then heated on the steam bath for five minutes. Dilution gives 6-bromo - N - methyl - 3,4 - dihydrosulfostyril, M.P. 109–111° C.

Example 10

A mixture of 10 g. of dihydrosulfostyril with equimolar amounts of sodium hydride and ethylene chlorohydrin is reacted as described to give N-(β-hydroxyethyl)-3,4-dihydrosulfostyril.

This compound (11 g.) is reacted with a slight excess of tosyl chloride in pyridine. Quenching with water gives N-(β-tosyloxyethyl)-3,4-dihydrosulfostyril.

The tosyloxy intermediate is heated briefly in dimethylsulfoxide in 2 g. portions respectively with an excess of butylamine, piperazine and ethylamine to give upon quenching each reaction mixture in water N-(butylaminoethyl)-3,4-dihydrocarbostyril, N - (piperazinylethyl)-3,4-dihydrocarbostyril and N-(ethylaminoethyl)-3,4-dihydrocarbostyril as oils.

Example 11

A mixture of 5 g. of dihydrosulfostyril in dimethylformamide is reacted with an excess of acrylonitrile in the presence of base for several days to give N-cyanoethyl-3,4-dihydrosulfostyril.

This compound (4 g.) is reduced with palladium-on-charcoal at 50 p.s.i. to give N-(aminoethyl)-3,4-dihydrosulfostyril. This base (500 g.) in dimethylsulfoxide is reacted with an excess of hydrogen bromide to give the acid addition salt.

Example 12

A mixture of 1.85 g. of dihydrosulfostyril, an equimolar amount of N-chlorosuccinimide and dimethylformamide is reacted as in Example 7 to give 6-chloro-3,4-dihydrosulfostyril. This compound (1.25 g.) is reacted with sodium hydride and 2-(N-methylpyrrolidinyl-3)-ethyl bromide to give 6-chloro-N-(N-methylpyrrolidinyl-3-ethyl)-3,4-dihydrosulfostyril.

Example 13

An equimolar quantity of 2-nitro-4,5-dimethoxyphenethyl chloride is substituted in Example 1 for 2-nitrophenethyl bromide gives 6,7-dimethoxy-3,4-dihydrosulfostyril. Using 2-nitro-4,5-methylenedioxyphenethyl bromide gives 6,7-methylenedioxy-3,4-dihydrosulfostyril.

Example 14

N-methylsulfostyril (4.7 g.) is dissolved in ethyl alcohol and hydrogenated at room temperature and 50 p.s.i. in the presence of palladium-on-carbon catalyst. The reduction is complete in 30 minutes. The catalyst is filtered and the solvent removed in vacuo leaving a quantitative yield of N-methyldihydrosulfostyril. In a similar manner is reduced 6-trifluoromethylsulfostyril. Alternatively, this latter compound is reduced by dissolving in 5% sodium hydroxide and hydrogenating using 5% palladium-on-carbon catalyst. At the conclusion of the reduction, the catalyst is filtered and the filtrate is acidified with hydrochloric acid. The product, 6-trifluoromethyl-3,4-dihydrosulfostyril, is filtered off and recrystallized from alcohol-water.

Example 15

Dihydrosulfostyril (5 g.) is dissolved in 100 ml. tetrahydrofuran and 3 g. acetic anhydride. Triethylamine (7 g.) is added and the solution is refluxed for three hours. After concentrating to dryness and adding a little water, the product separates and is recrystallized from alcohol-water.

Example 16

3,4-dihydrosulfostyril (5 g.) in 5 ml. of glacial acetic acid and 10 ml. of concentrated sulfuric acid is cooled and stirred while 4 g. of concentrated nitric acid and 2.5 g. of concentrated sulfuric acid are added. After 24 hours at room temperature the mixture is poured onto ice to give 6-nitro-dihydrosulfostyril.

Example 17

6-nitrodihydrosulfostyril (2 g.) in 200 ml. of glacial acetic acid is hydrogenated at 50 p.s.i. and 70° C. using 5% palladium-on-charcoal. The catalyst is removed and the filtrate concentrated in vacuo. The residue, 6-aminodihydrosulfostyril, is recrystallized from aqueous ethanol.

What is claimed:

1. A compound of the structure:

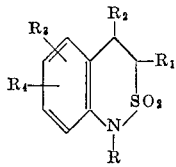

in which:
R is a member selected from the group consisting of hydrogen, lower alkanoyl, lower alkyl, phenyl and dialkylaminoalkyl;
$R_1$ and $R_2$ are members selected from the group consisting of hydrogen, lower alkyl and phenyl; and
$R_3$ and $R_4$ are members selected from the group consisting of hydrogen, nitro, halo, lower alkyl, trifluoromethyl, lower alkoxy, lower alkylthio, amino, sulfonamido and, when taken together, methylenedioxy.

2. A compound of the structure:

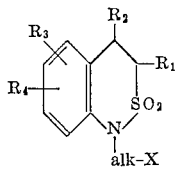

in which:
X is a member selected from the group consisting of hydroxy, chloro, cyano, tosyloxy and lower alkanoylamino;
alk is an ethylene chain of from 2–6 carbon atoms;
$R_1$ and $R_2$ are members selected from the group consisting of hydrogen, lower alkyl and phenyl; and
$R_3$ and $R_4$ are members selected from the group consisting of hydrogen, halo, nitro, lower alkyl, lower alkoxy, trifluoromethyl, lower alkylthio and, when taken together, ethylenedioxy.

3. 3,4-dihydro-2,1-benzothiazine-2,2-dioxide.

4. N-(dimethylaminoethyl)-3,4-dihydro-2,1 - benzothiazine-2,2-dioxide.

5. N-(dimethylaminopropyl)3,4-dihydro-2,1 - benzothiazine-2,2-dioxide hydrochloride.

6. 6-bromo-3,4-dihydro-2,1-benzothiazine-2,2-dioxide.

7. 6,8-dibromo-3,4-dihydro-2,1-benzothiazine - 2,2 - dioxide.

8. The process of preparing 6-halo-3,4 - dihydro - 2,1-benzothiazine-2,2-dioxides, comprising reacting a 3,4-dihydro-2,1-benzothiazine-2,2-dioxide with a N-halosuccinimide.

9. A compound selected from the group consisting of a free base, its nontoxic salts with pharmaceutically acceptable acids and its nontoxic quaternary ammonium salts, said base being of the structure:

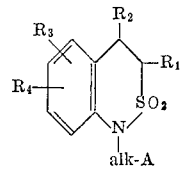

in which:
A is a member selected from the group consisting of amino, lower alkyl amino, dilower alkyl amino, N-piperazinyl, N,N-lower alkylpiperazinyl, N-piperidinyl, N-pyrrolidinyl, N-morpholinyl, N-thiomorpholinyl, C-N-methylpiperidinyl and C-N-methylpyrrolidinyl;
alk is an alkylene chain of from 2–6 carbon atoms;
$R_1$ and $R_2$ are members selected from the group consisting of hydrogen, lower alkyl and phenyl; and
$R_3$ and $R_4$ are members selected from the group consisting of hydrogen, halo, lower alkyl, lower alkoxy, trifluoromethyl, nitro, lower alkylthio, and, when taken together, methylenedioxy.

References Cited by the Examiner

Theilheimer: "Synthetic Methods of Organic Chemistry," vol. 11, Interscience Pub., Inc., New York (1957), page 158, No. 364.

Noller: "Chemistry of Organic Compounds," 2nd edition, W. B. Saunders Co., New York (1957), page 797.

Chemical Abstracts, Subject Index (January–June 1960), vol. 54, page 244s.

Chemical Abstracts, Subject Index (January–June 1962), vol. 56, page 326s.

WALTER A. MODANCE, *Primary Examiner.*

JOHN M. FORD, *Assistant Examiner.*